(12) United States Patent
Yu (10) Patent No.: US 10,050,956 B2
(45) Date of Patent: Aug. 14, 2018

(54) SYSTEM ARCHITECTURE AND METHOD FOR GUARANTEEING NETWORK INFORMATION SECURITY

(71) Applicant: Zhi Yu, Shenzhen (CN)

(72) Inventor: Zhi Yu, Shenzhen (CN)

( * ) Notice: Subject to any disclaimer, the term of this patent is extended or adjusted under 35 U.S.C. 154(b) by 146 days.

(21) Appl. No.: 15/115,265

(22) PCT Filed: Jun. 12, 2015

(86) PCT No.: PCT/CN2015/081340
§ 371 (c)(1),
(2) Date: Jul. 29, 2016

(87) PCT Pub. No.: WO2016/101554
PCT Pub. Date: Jun. 30, 2016

(65) Prior Publication Data
US 2017/0006014 A1    Jan. 5, 2017

(30) Foreign Application Priority Data
Jun. 4, 2015   (CN) .......................... 2015 1 0304412

(51) Int. Cl.
*H04L 29/06* (2006.01)
*H04W 12/06* (2009.01)

(52) U.S. Cl.
CPC ........ *H04L 63/083* (2013.01); *H04L 63/0428* (2013.01); *H04L 63/06* (2013.01); *H04W 12/06* (2013.01)

(58) Field of Classification Search
CPC .................................................... H04L 63/083
See application file for complete search history.

(56) References Cited

U.S. PATENT DOCUMENTS

2015/0082399 A1    3/2015   Wu et al.

FOREIGN PATENT DOCUMENTS

| | | |
|---|---|---|
| CN | 101226609 A | 7/2008 |
| CN | 101692636 A | 4/2010 |
| CN | 101808095 A | 8/2010 |
| CN | 102664928 A | 9/2012 |
| CN | 103346998 A | 10/2013 |
| CN | 104836817 A | 8/2015 |

*Primary Examiner* — Simon P Kanaan
(74) *Attorney, Agent, or Firm* — Gokalp Bayramoglu (57) ABSTRACT

Disclosed is a system architecture and method for guaranteeing network information security, the system architecture including the Internet, a program fragmentation processing unit and an authentication unit. The method includes: acquiring a first set and a second set of 13-bit decimal data, judging whether the data is in line with EAN13 and serial number coding principles, if yes, encrypting the two sets of data, to generate a third set of data, obtaining three sets of data codes and using them as new IP addresses, upon program fragmentation processing on the new IP addresses, an authentication center decrypting the three sets of data, if a computation result is "0", transmitting information to a target user, that is, an interviewee, after encryption of the three sets of data, and storing three sets of data codes divided into three lines, used for network addressing.

5 Claims, 9 Drawing Sheets

FIG. 1

Authentication code 2007120500000
Serial number 691779600142
EAN13 code 9787541817243

SYSTEM ARCHITECTURE AND METHOD FOR GUARANTEEING NETWORK INFORMATION SECURITY

FIELD OF INVENTION

The present invention relates to applications of commercial password technologies in guaranteeing network information security, which are a digital password authentication system and method that can guarantee network information security.

BACKGROUND

The Internet is an international computer network formed by a wide area network, a local area network and a single machine according to a certain communication protocol. The Internet is a result of linking two computers or more than two computer terminals, clients and servers through means of computer information technologies.

With more and more frequent network attack events, security vulnerabilities have made user security and protection measures become a disturbing focus, wherein even large well-known users with security awareness face the same issue, and the network information security issue has become one of the important issues to be solved by the information society. Therefore, ensuring safety protection will be a necessary IT demand, instead of only owning the equipment. The security vulnerabilities cross various industries, and extend to access, infrastructure and applications; which may occur on fixed and mobile networks, and damage users' entity, intellectual property and financial capital. Any downtime caused by network vulnerability may bring about frustrating effects on customers' experience and users' brand reputation, and finally affect service benefit and sustainability.

A password technology is one of the important means of protecting network information security. The password technology has been in existence since ancient times, and so far, has gone from the diplomatic and military field to the public. It not only has an information encryption function that ensures information confidentiality, but also has functions such as digital signature, identity authentication and system security. Therefore, using the password technology not only can ensure information confidentiality, but also can ensure information integrity and certainty, and prevent information from being tampered, counterfeited and faked.

SUMMARY OF THE INVENTION

An objective of the present invention is to provide an architecture and method that encrypt, identify and protect network information with respect to the shortcomings of the prior art, which has express parts as well as password parts, both of which are easy to identify for visitors and users, and not easy to counterfeit and fake.

The objective of the present invention can be achieved through the following technical solutions:

A system architecture for guaranteeing network information security, includes the Internet, that is, an international computer network formed by a wide area network, a local area network and a single machine according to a certain communication protocol, wherein the system further includes:

a program fragmentation processing unit used for performing program fragmentation processing on data; and an authentication unit used for performing encryption and decryption computations on the data.

A system method for guaranteeing network information security, wherein the method includes:

(1) acquiring a first set and a second set of 13-bit decimal data to be processed by a computer;

(2) the computer judging whether the first set of data is in line with an internationally agreed EAN13 coding principle, if yes, the background making the data correspond to an IPV4 address of a user, and if no, prompting an error;

(3) the computer judging whether the second set of data is in line with a serial number coding principle, if yes, performing the next step, and if no, prompting an error;

(4) the computer encrypting the first set of data in line with the EAN13 coding principle and the second set of data in line with the serial number coding principle through a commercial password algorithm, to generate a 13-bit decimal authentication code, that is, a third set of data;

(5) the computer dividing the first set of data, the second set of data and the third set of data into three lines, that is, three sets of data codes are obtained, and using them as new IP addresses of the user;

(6) a visitor transmitting information containing the new IP addresses of the user to a program fragmentation processing unit of a computer system, that is, CN39-313 which performs program fragmentation processing on the data and divides the data into three segments, each segment being a 13-bit decimal number, that is, 52-bit binary number;

(7) the computer transmitting the three sets of data to an authentication center which decrypts the three sets of data, if a computation result is "0", transmitting information to a target user, that is, an interviewee, after encryption of the three sets of data, and if the computation result is "1", abandoning transmission; and (8) the computer storing three sets of data codes divided into three lines, used for network addressing.

According to the system method for guaranteeing network information security, the coding principle of the second set of data, that is, the serial number coding principle, is that positions 1-4 are 4-bit year codes, positions 5-6 are 2-bit month codes, positions 7-8 are 2-bit date codes, and positions 9-13 are 5-bit serial number codes of the date.

According to the system method for guaranteeing network information security, after the authentication code is obtained, the authentication code is decrypted through the commercial password algorithm, and the first set and the second set of 13-bit decimal data can be obtained.

According to the system method for guaranteeing network information security, the computer divides the first set of data, the second set of data and the third set of data into three lines and then stores the data in a manner of storing the first set of data, the second set of data and the third set of data in three lines.

According to the system method for guaranteeing network information security, in product logo printing, the computer divides the first set of data, the second set of data and the third set of data into three lines and then stores the data in a manner of storing and printing the first set of data, the second set of data and the third set of data in three lines, a lower line, an upper line and a middle line.

Technical advantages of the present invention are as follows: the designed method for guaranteeing network information security has express parts as well as password parts, both of which are easy to identify for visitors and users, not easy to counterfeit and fake, have high security,

DETAILED DESCRIPTION OF THE INVENTION

The present invention is further described in detail with reference to the accompanying drawings and implementation methods.

Figure 1:
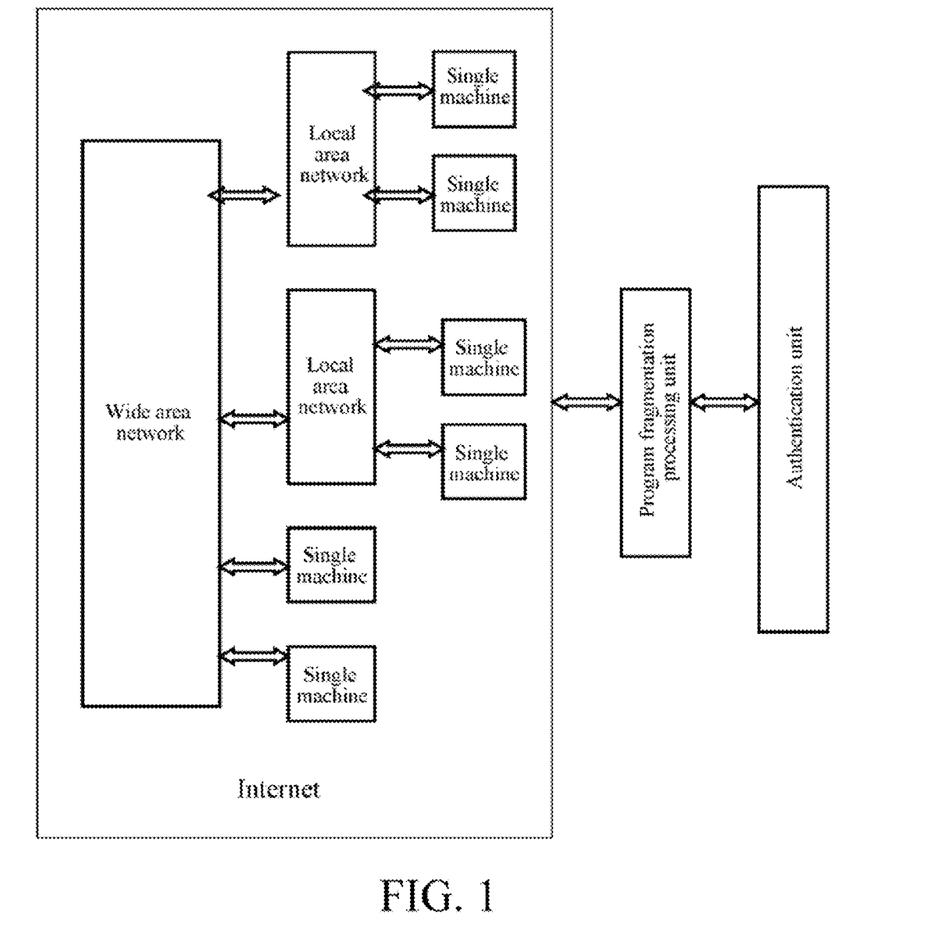
FIG. 1 is a schematic diagram of a system architecture.

A system architecture, as shown in FIG. 1, mainly consists of the Internet jointly formed by lots of elements such as a user, a visitor and a network platform, a program fragmentation unit and an authentication unit. The whole flow is basically as follows: at first, three sets of data codes are generated through the authentication unit, the data codes are used as new IP addresses, and the visitor can know the three sets of data codes. When the visitor accesses the user, it is necessary to transmit information containing the new IP addresses of the user to the program fragmentation unit, the program fragmentation unit performs program fragmentation processing on the data and divides the data into three sets of data codes, an authentication center authenticates authenticity of the three sets of data codes, and if the authentication is passed, the information is transmitted, and otherwise, transmission is abandoned.

The present invention, on the basis of user EAN13 coding, increases a serial number coding and an authentication code. The EAN13 coding is a universal manner of uniquely identifying a product worldwide, while the IP address is an address in a TCP/IP network used to uniquely identify each host or device, and both correspond to each other. The serial number coding uniquely identifies the second set of codes and is an ordered expansion for IPV4, and the IP address is expanded from $2^{32}$ to $2^{64}$ and meets the technical difficulty that the current IP address is not enough. The authentication code is encrypted and generated by the EAN13 coding and the serial number coding through a commercial password algorithm. After the authentication code is obtained through encryption of the password algorithm, the EAN13 coding and the serial number coding can be obtained through decryption of the commercial password algorithm, achieving the aim of authentication. The three sets of data codes can uniquely identify the IP address of the user worldwide, the probability that the three sets of data codes of the user are guessed is one over ten trillion, and thus the error at which the three sets of data codes identify the user one over ten trillion.

IPV4 addresses have been completely assigned all over the world, and each IPV4 address includes two parts: a network address and a host address. Each networked computer has no right to set an IP address on its own, there is a unified institution responsible for assigning a unique network address to an organization that makes an application, the organization can assign a unique host address to each host in its network, and uniqueness of the network address and uniqueness of the host address in the network ensure global uniqueness of the IPV4 address.

I. User EAN13 Coding

China is currently a member of FAN (European Article Number), which is managed by the Coding Promotion Committee, and manufacturers can file an application for use. EAN13 coding is divided into 13 codes and 8 codes, 13 codes are applied to general products, while 8 codes are applied to products with a smaller volume.

1. EAN13 Code Coding Principle
Positions 1-3 are country code;
Positions 4-7 are vendor code:
Positions 8-12 are product code; and
Position 13 is check code.
The first three bits are internationally uniformly assigned, is 690-695 in China.
If the coding starts with 690 or 691, Positions 4-7 are vendor code, and Positions 8-12 are product code,
if the coding starts with 692-695, Positions 4-8 are vendor code, and Positions 9-12 are product code, and
the final position is check code.

2. Book-Based EAN13 Coding
Positions 1-3 are book code;
Positions 4-12 are first 9 bits of the original ISBN code; and
Position 13 is check code.

3. Periodical-Based EAN13 Coding
Positions 1-3 are periodical code;
Positions 4-10 are first 7 bits of the original IASN code;
Positions 11-12 are year code; and
Position 13 is check code.

4. Relationship Between EAN8 Coding and EAN13 Coding
1) EAN8 Code Coding Principle:
Positions 1-3 are country code;
Positions 4-7 are vendor code; and
Position 8 is check code.
2) Convert EAN8 Code to EAN13
Reserve: Positions 1-3 are country code;
Positions 4-7 are vendor code;
Increase: Positions 8-12 are 00000; and
Position 13 is EAN13 check code.

II. Serial Number Coding

1. When the number of the second set of codes generated on is not greater than 100,000,
Positions 1-4 are 4-bit year code (e.g., 2007);
Positions 5-6 are 2-bit month code (e.g., 11);
Positions 7-8 are 2-bit date code (e.g., 21); and
Positions 9-13 are 5-bit serial number code (e.g., 00000-99999).

2. When the Yield on the Date is Riot Greater Than One Million,
Positions 1-3 are 3-bit year code (e.g., 2007 is represented with 007);
Positions 4-5 are 2-bit month code (e.g., 11);
Positions 6-7 are 2-bit date code (e.g., 21); and
Positions 8-13 are 6-bit serial number code (e.g., 000000-999999).

3. When the Yield on the Date is Not Greater Than 10 Million,

Positions 1-2 are 2-bit year code (e.g., 2007 is represented with 07);

Positions 3-4 are 2-bit month code (e.g., 11);

Positions 5-6 are 2-bit date code (e.g., 21); and

Positions 7-13 are 7-bit serial number code (e.g., 0000000-9999999).

III. Authentication Code

The authentication code is a 13-bit decimal number generated by encrypting the first set of EAN13 codes and the second set of serial number codes through the commercial password algorithm, and is unique and random.

The three sets of data are divided into lower, middle and upper rows, and three sets of data codes uniquely identify one user worldwide, and authenticity can be authenticated through encryption and decryption of the commercial password algorithm, achieving the aim of identifying and protecting network information security.

0-9 numbers are used as data carriers of the three sets of data codes, and the three sets of data codes are divided into three lines and stored, used for identifying and authenticating network IP.

IV. The Three Sets of Data Codes Made According to the Above Steps Have the Following Advantages:

The three sets of data codes are formed by two sets of plaintext and one set of ciphertext, safe reliability of the three sets of data codes is established on the basis of confidentiality of the password algorithm and a secret key, and thus making the ciphertext public will not affect security of the password algorithm. The possibility of decoding the password algorithm is deemed to be non-existent.

The three sets of data codes are formed by 39-bit decimal numbers, the variation is $10^{39}$, and this ensures that the three sets of data codes of all users are unique; the three sets of data codes are formed by three sets of 13-bit decimal numbers, wherein the first set and the second set are plaintexts, and the third set is authentication code, that is, ciphertext. Therefore, the probability that the three sets of data codes of the user are guessed is one over ten trillion, evidently, this is a small probability event, and even if the guess is successfully, it will not threaten three sets of data codes of other users.

V. Application of the Three Sets of Data Codes

The three sets of data codes become reality for third-party authentication; the authentication unit owns a password algorithm and a key, the user owns three sets of data codes, and the visitor can know the three sets of data codes. The visitor transmits information containing the three sets of data codes of the user to the authentication unit, authenticity is verified through the authentication unit, if authentication is passed, the information is transmitted, and otherwise, the information is abandoned. The authentication unit monitors an IP of a sender in real time, and if a certain IP continuously sends three sets of data codes in great quantity, even if authentication is passed, the authentication unit will also shield the IP to block transmission of the information.

It is feasible to read three sets of data codes through a network, a POS system, a mobile phone and many other manners, the operation is simple, and the use is convenient and quick. The three sets of data codes have a small volume (3 cm*3 cm), great information quantity ($10^{39}$), and are visible.

1. Confidentiality of the three sets of data codes is as follows: there is plaintext as well as ciphertext, and the probability of being guessed is one over ten trillion. One basic principle of information privacy is that making details of an algorithm public will not fundamentally affect security of the algorithm, that is, privacy relies on the key, and in the solution, even if the ciphertext is disclosed, security of the three sets of data codes will not be affected.

2. The three sets of data codes are applied to user's network information security management, and provide a digital platform in line with the international standard for the user's digital management over network information. The three sets of data codes and users one-to-one correspond, the authentication unit helps the user to filter malicious attacks and error information, thus ensuring normal access to user websites and the e-mail processing speed and increasing security and timeliness of processing network information by users.

VI. Establishment of a System of Three Sets of Data Codes Requires Establishing a Computer Authentication Unit and a Reading System of Three Sets of Data Codes.

The computer authentication unit has encryption, decryption, encoding, decoding, network transmission, data query, data comparison and other functions, and is provided with an EAN13 code database, an IPV4 address database, a database of three sets of data codes, a commercial password database and the like, wherein the commercial password database is used for managing the key and the commercial password algorithm, ensuring security of the key and the algorithm.

The authentication unit collects the user's EAN13 coded data and serial number coded data and initializes the database. Data of the database is encrypted through the commercial password algorithm, and a 13-bit decimal-number product authentication code is generated and stored in the corresponding database of three sets of data codes. The three sets of data are stored in an order of upper, middle and lower, that is, "three sets of data codes". Each user uses one of the three sets of data codes for authentication, and the visitor uses a code-reading device to read the user's three sets of data codes, which are transmitted to the authentication unit via the network. The authentication unit decodes the three sets of data codes, converts them into three sets of 13-bit decimal data, decrypts them with the commercial password algorithm, verifies validity of the three sets of data codes, if yes, generates EAN13 code and serial number code. Then compare the EAN13 code and the serial number code with the EAN13 code and the serial number code in the initial database, if comparison is passed, verification passed, the information is transmitted, and otherwise, the information is abandoned.

The reading system of three sets of data codes provides the visitor with multiple reading manners, and the visitor transmits the three sets of data codes to the authentication unit, judges whether the EAN13 code is legal, and judges whether the serial number code is legal; then judges whether the combination of the EAN13 code and the serial number is legal; and finally judges whether the authentication code is legal. If no, transmission is abandoned, and if yes, the information is directly transmitted.

The three sets of data codes are used for protecting network information security, and may be divided into:

1. Apply for a password algorithm

A required commercial password algorithm, for example, a hash algorithm or a random number generation algorithm, is approved according to the provisions of Regulations on the Commercial Passwords.

Figure 2:
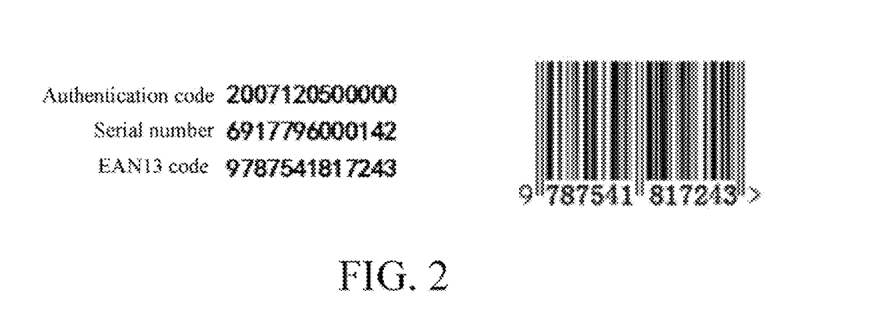
FIG. 2 is a schematic diagram of three sets of data codes.

2. The schematic diagrams of the three sets of data codes and EAN13 codes, as shown in FIG. 2:

The three sets of data codes consist of the user's EAN13 code, a serial number code and an authentication code, and consist of three sets (an upper set, a middle set and a lower set) of codes.

Figure 3:
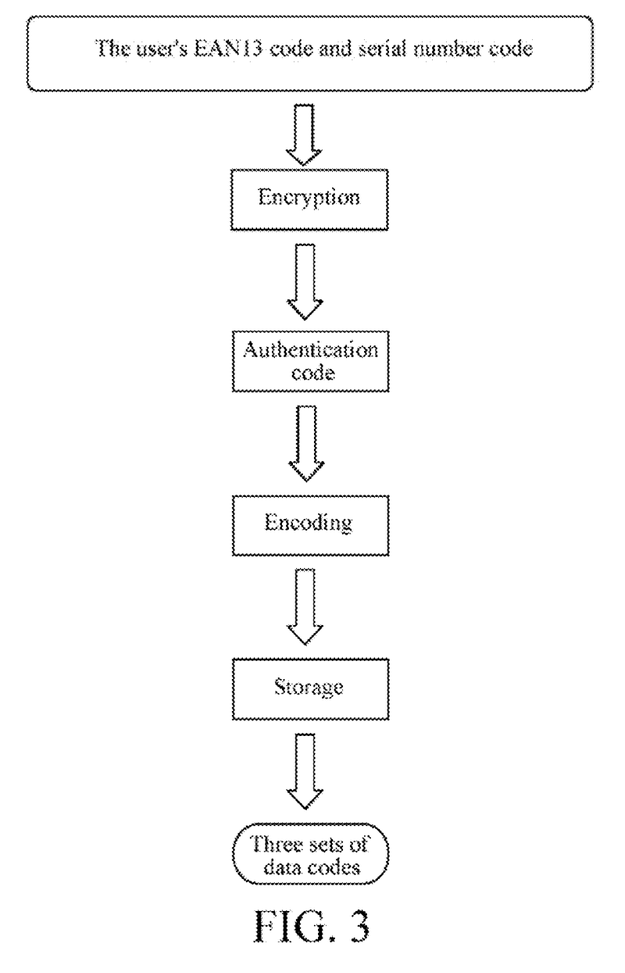
FIG. 3 is a schematic diagram of a generation flow of the three sets of data codes.

3. Generation of the three sets of data codes, as shown in FIG. 3:

(1) Initialization: the authentication unit collects the user's EAN13 code and the serial number code, and initializes the database.

(2) Encryption: data of the database is encrypted through the commercial password algorithm, and a 13-bit decimal-number authentication code is generated and stored in the corresponding database.

(3) Encoding: the user's EAN13 code, the serial number code and the authentication code are divided into three sets of 13-bit decimal numbers, and stored in the database of three sets of data codes.

Figure 4:
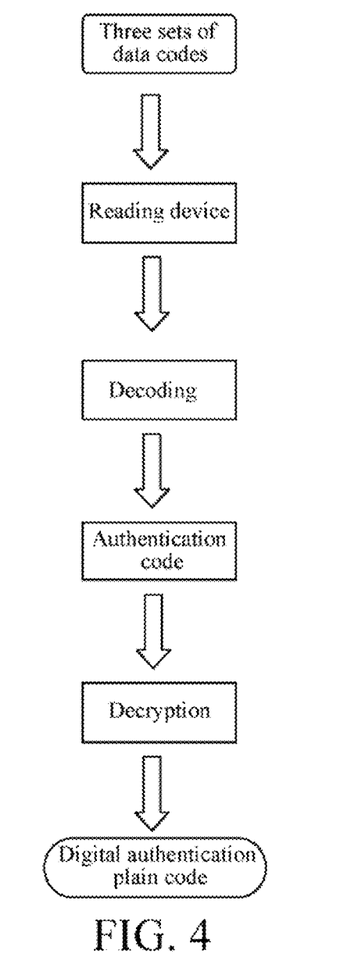
FIG. 4 is a schematic diagram of an authentication flow of the three sets of data codes.

4. Identification of the three sets of data codes, as shown in FIG. 4:

(1) Code-reading: the visitor uses a code-reading device to read the user's three sets of data codes, which are transmitted to the authentication unit via the network.

(2) Decoding: the authentication unit decodes the three sets of data codes, and converts them into three sets of 13-bit decimal numbers. The authentication code is stored in the password database.

(3) Decryption: the authentication unit decrypts the authentication code with the commercial password algorithm, and generates two sets of 13-bit decimal numbers, that is, digital authentication plain code.

Figure 5:
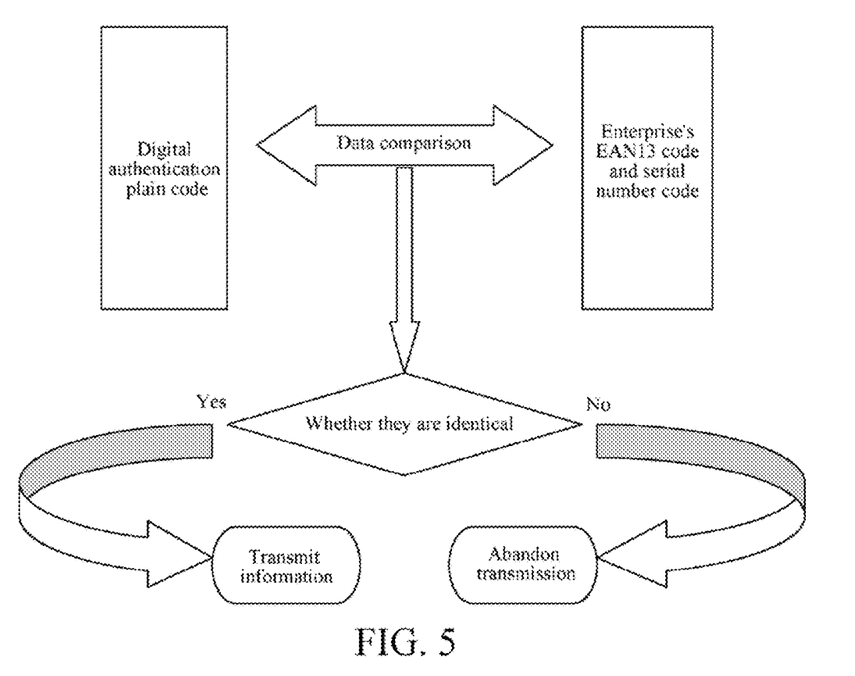
FIG. 5 is a schematic diagram of a comparison flow of the three sets of data codes.

5. Comparison of the three sets of data codes, as shown in FIG. 5:

(1) The authentication unit compares the digital authentication plain code with the EAN13 code and the serial number code of the product in the initial database.

(2) A comparison result is fed back, if they are identical, the verification is passed and the information is transmitted, and if they are not identical, transmission is abandoned.

Figure 6:
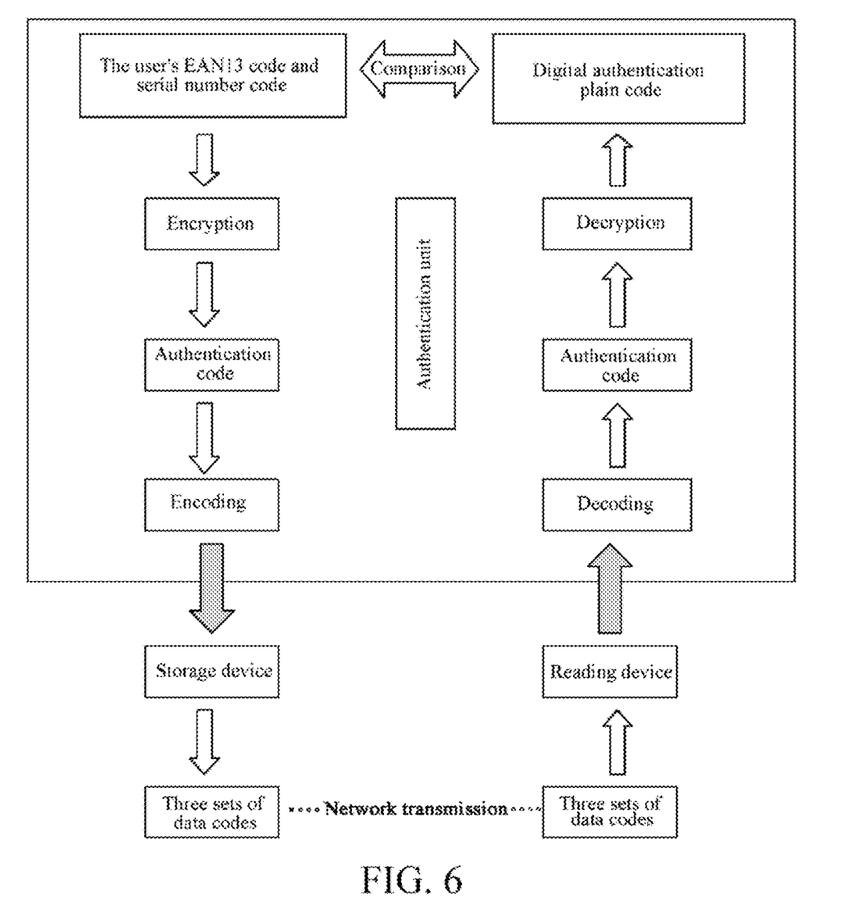
FIG. 6 is a schematic diagram of a data flow of the three sets of data codes.

6. A data flow of the three sets of data codes, as shown in FIG. 6:

(1) An authentication unit is established, and the center has encryption, decryption, encoding, decoding, network transmission, data query, data comparison and other functions.

(2) The authentication unit collects the user's EAN13 code and serial number code which are two sets of 13-bit decimal data, and generates a set of 13-bit decimal data through encryption, and the three sets of data are stored in the database of three sets of data codes, used for network addressing. The visitor reads decimal data of three sets of data codes, or reads EAN13 coded data of the three sets of data codes, the data is transmitted to the authentication unit, and the authentication code is decrypted to generate two sets of decimal data of the user's EAN13 code and serial number code, which are stored into a digital authentication plain code database. The digital authentication plain code database is compared with the initialized database, to determine according to the result whether to transmit the information.

Figure 7:
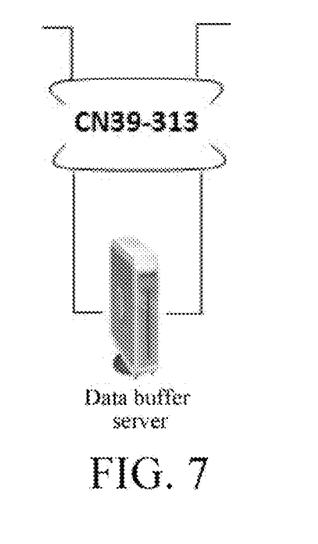
FIG. 7 is a schematic diagram of program fragmentation.

7. Program fragmentation, as shown in FIG. 7:

(1) The visitor transmits information containing the user's new IP address to CN39-313.

(2) CN39-313 performs program fragmentation processing on the data, and divides the data into 3 segments, each segment being a 13-bit decimal number, that is, 52-bit.

Figure 8:
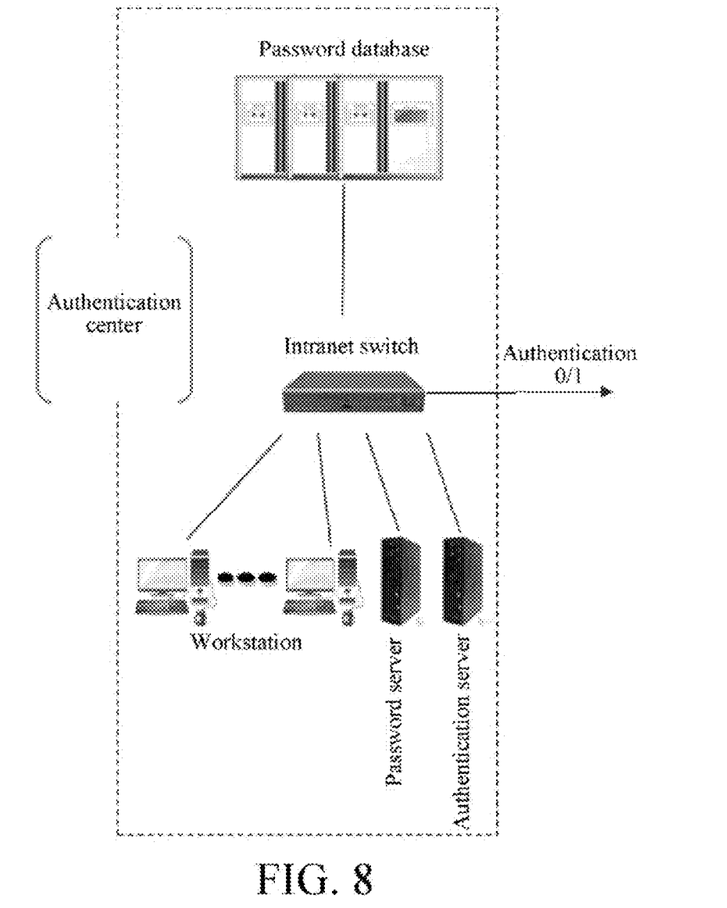
FIG. 8 is a schematic diagram of an authentication unit.

8. The authentication unit, as shown in FIG. 8:

(1) The authentication unit performs decryption computations on the three sets of data.

(2) If the computation result is "0", the information is transmitted, and if the computation result is "1", transmission is abandoned.

Figure 9:
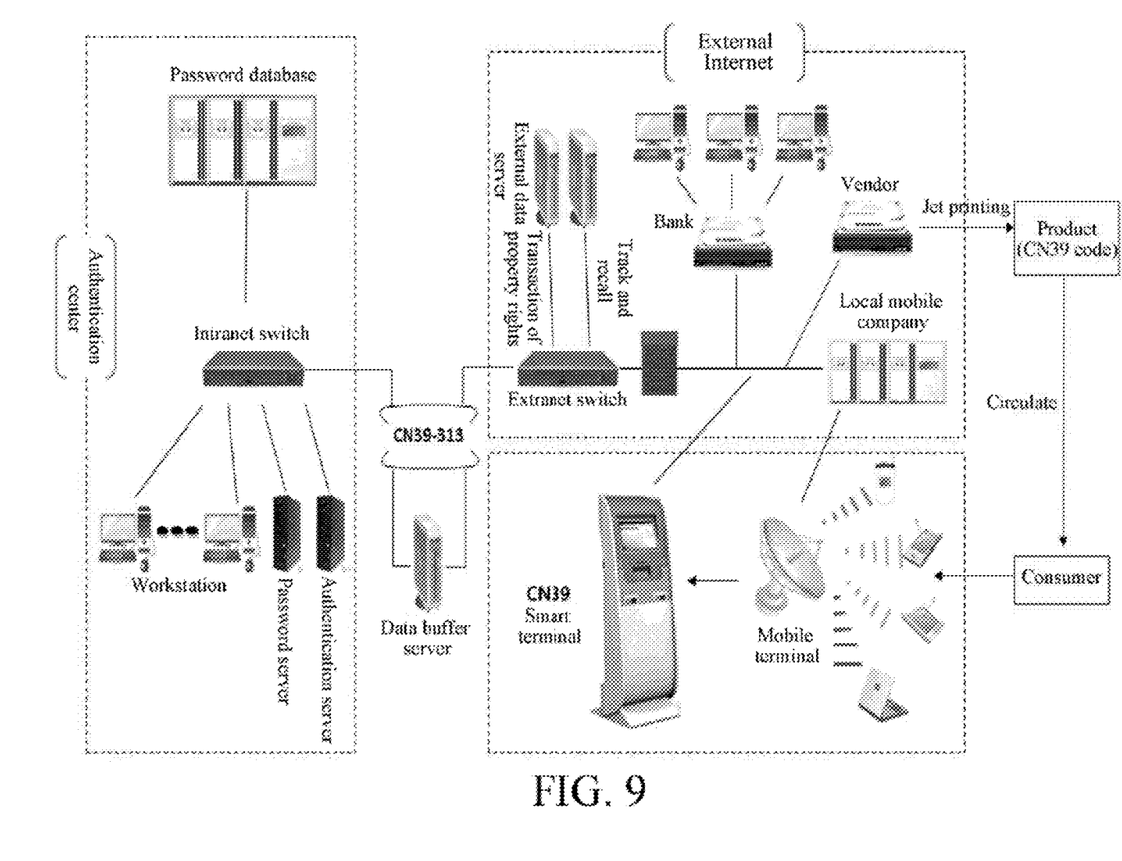
FIG. 9 is a schematic diagram of a detailed system architecture.

9. The system architecture, as shown in FIG. 9:

The system architecture shown in FIG. 9 is a detailed schematic diagram, which mainly consists of an authentication center, a manufacturer, a bank, a network platform, a logistics enterprise, consumers and many other elements, and the operation flow of the whole system is basically as follows: at first, three sets of data codes are generated through the authentication center on the fell side of FIG. 9 and then are sent to each manufacturer in a physics isolation manner, upon receipt, the manufacturer labels the three sets of data codes onto the corresponding products through a labeling device on the production line, which are circulated through the logistics enterprise, when the consumers get the products, they can query the three sets of data codes on the products through smartphones or smart terminal devices, and the queried information category includes basic production information, raw material information, inspection and quarantine information, base information and other upward "traceability information" of the products, and also includes downward "trace information" starting from packaging and leaving the factory to all levels of logistics distribution, merchant sales and consumers' purchasing products and even switch operation until loss of the products.

A data flow of a food safety cloud service platform is: authentication center (data generation)→vendor (data receiving and corresponding to a single product)→logistics enterprise (data flow)→consumer (query data)→authentication center (data authentication, the data passes the authentication if the computation result is "0", and a query request is forwarded to the vendor)→vendor (which receives the query request and makes feedback). During this, when the consumer queries the product in hands, the data has to go back to the authentication center to authenticate whether three sets of data codes on the product exist or not and whether the data codes are correct and legal, the authentication is passed only when the three sets of data on the identification are zeroed out, and then the corresponding vendor database is addressed to call out corresponding product information which is sent to a query terminal of the consumer for display.

A system architectural diagram of a method for guaranteeing network information security is made on the basis of the system architectural diagram shown in FIG. 9, the system architectural diagram is different in that it mainly consists of an authentication center, a user, a network platform, a visitor and the like, and the whole operation flow is basically as follows: at first, three sets of data codes are generated and stored through the authentication unit on the left side of the figure and are used as the users' new IP address, and the visitor can know the three sets of data codes. When the visitor accesses the user, the visitor needs to transmit to the authentication unit information containing the three sets of data codes of the user, authenticity is verified through the authentication unit, if the verification is passed, the information is transmitted, and otherwise, transmission is abandoned.

A corresponding data flow chart is: authentication unit (which generates data)→user (who is assigned with a new IP address)→visitor (who reads the new IP address)→authentication unit (which authenticates and transmits, decrypts the three sets of data, transmits the information if the computation result is "0", and abandons transmission if the computation result is "1")→user (who makes corresponding feedback according to the information content). In this process, when the visitor accesses the user, the visitor needs to first transmit information containing the three sets of data codes of the user to the authentication unit, and after authentication is zeroed out, the authentication unit will further send the information to the user.

What is claimed is:

1. A system method for guaranteeing network information security, herein the method comprises:
   (1) acquiring a first set and a second set of 13-bit decimal data to be processed by a computer;
   (2) the computer judging whether the first set of data is in line with an internationally agreed EAN13 coding principle, if yes, the background making the data correspond to an IPV4 address of a user, and if no, prompting an error;
   (3) the computer judging whether the second set of data is in line with a serial number coding principle, if yes, performing the next step, and if no, prompting an error;
   (4) the computer encrypting the first set of data in line with the EAN13 coding principle and the second set of data in line with the serial number coding principle through a commercial password algorithm, to generate a 13-bit decimal authentication code, that is, the third set of data;
   (5) the computer dividing the first set of data, the second set of data and the third set of data into three lines, that is, three sets of data codes are obtained, and using them as new IP addresses of the user;
   (6) a visitor transmitting information containing the new IP addresses of the user to a program fragmentation processing unit of a computer system, that is, CN39-313 which performs program fragmentation processing on the data and divides the data into three segments, each segment being a 13-bit decimal number, that is, 52-bit binary number;
   (7) the computer transmitting the three sets of data to an authentication center which decrypts the three sets of data, if a computation result is "0", transmitting information to a target user, that is, an interviewee, after encryption of the three sets of data, and if the computation result is "1", abandoning transmission; and
   (8) the computer storing three sets of data codes divided into three lines, used for network addressing.

2. The system method for guaranteeing network information security according to claim 1, wherein the coding principle of the second set of data, that is, the serial number coding principle, is that positions 1-4 are 4-hit year codes, positions 5-6 are 2-bit month codes, positions 7-8 are 2-bit date codes, and positions 9-13 are 5-bit serial number codes of the date.

3. The system method for guaranteeing network information security according to claim 1, wherein, after the authentication code is obtained, the authentication code is decrypted through the commercial password algorithm, and the first set and the second set of 13-bit decimal data can be obtained.

4. The system method for guaranteeing network information security according to claim 1, wherein the computer divides the first set of data, the second set of data and the third set of data into three lines and then stores the data in a manner of storing the first set of data, the second set of data and the third set of data in three lines.

5. The system method for guaranteeing network information security according to claim 4, wherein, in product logo printing, the computer divides the first set of data, the second set of data and the third set of data into three lines and then stores the data in a manner of storing and printing the first set of data, the second set of data and the third set of data in three lines, a lower line, an upper line and a middle line.

* * * * *